United States Patent
Graeber

(10) Patent No.: US 8,091,024 B2
(45) Date of Patent: Jan. 3, 2012

(54) SYSTEMS AND METHODS FOR IMPLEMENTING FORMULAS

(75) Inventor: Astrid Graeber, Walldorf (DE)

(73) Assignee: SAP AG, Walldorf (DE)

( * ) Notice: Subject to any disclaimer, the term of this patent is extended or adjusted under 35 U.S.C. 154(b) by 596 days.

(21) Appl. No.: 12/285,625

(22) Filed: Oct. 9, 2008

(65) Prior Publication Data

US 2009/0055733 A1 Feb. 26, 2009

Related U.S. Application Data

(62) Division of application No. 10/898,921, filed on Jul. 27, 2004, now Pat. No. 7,454,701.

(60) Provisional application No. 60/515,411, filed on Oct. 30, 2003, provisional application No. 60/539,974, filed on Jan. 30, 2004.

(51) Int. Cl.
*G06F 17/00* (2006.01)

(52) U.S. Cl. .............................. 715/267; 715/271

(58) Field of Classification Search .................. 715/271, 715/267, 256, 212, 214; 705/50; 708/100
See application file for complete search history.

(56) References Cited

U.S. PATENT DOCUMENTS

| | | | | |
|---|---|---|---|---|
| 4,012,725 A * | 3/1977 | Spangler et al. | ............... | 708/130 |
| 4,180,854 A * | 12/1979 | Walden et al. | ................. | 708/130 |
| 4,949,292 A * | 8/1990 | Hoshino et al. | ............... | 708/520 |
| 5,559,939 A | 9/1996 | Wada et al. | | |
| 5,633,998 A * | 5/1997 | Schlafly | ........................... | 714/1 |
| 5,721,911 A | 2/1998 | Ha et al. | | |
| 5,787,453 A | 7/1998 | Kennedy | | |
| 5,819,102 A * | 10/1998 | Reed et al. | ....................... | 712/34 |
| 5,897,649 A * | 4/1999 | Kennedy | ....................... | 715/210 |
| 6,020,896 A | 2/2000 | Demeure et al. | | |
| 6,061,749 A * | 5/2000 | Webb et al. | ..................... | 710/65 |
| 6,138,130 A * | 10/2000 | Adler et al. | .................... | 715/210 |
| 6,259,456 B1 * | 7/2001 | Gibson et al. | ................. | 345/619 |
| 6,292,811 B1 | 9/2001 | Clancey et al. | | |
| 6,388,672 B1 * | 5/2002 | Ide et al. | ....................... | 345/544 |
| 6,625,499 B2 | 9/2003 | Abdalla | | |
| 6,816,862 B2 | 11/2004 | Mulgund et al. | | |
| 2002/0057446 A1 * | 5/2002 | Long et al. | ................... | 358/1.13 |
| 2003/0188256 A1 | 10/2003 | Aureglia et al. | | |
| 2004/0148585 A1 | 7/2004 | Sengodan | | |
| 2006/0224428 A1 | 10/2006 | Schmidt et al. | | |
| 2006/0224702 A1 | 10/2006 | Schmidt et al. | | |

OTHER PUBLICATIONS

Griewonk, Andreas, et al, "Algorithm 755: ADOL-C: A Package for the Automatic Differentiation of Algorithms Written in C/C++", Transactions on Mathematical Software (TOMS), vol. 22, Issue 2, Jun. 1996, pp. 131-167.*
Jankun-Kelly, J.T., et al., "A Spreadsheet Interface for Visualization Exploration," Proceedings of the Conference on Visualization '00 VIS '00, Oct. 2000, pp. 69-77.
Liebich et al., U.S. Appl. No. 10/975,999, filed Oct. 29, 2004, entitled "Systems and Methods for Modeling Costed Entities and Performing a Value Chain Analysis."
SAP Manual for Online Help, "Concurrent Costing," Release 350, Copyright 2003 (Mar. 6, 2003), pp. 1-42.

* cited by examiner

*Primary Examiner* — Laurie Ries

(74) *Attorney, Agent, or Firm* — Finnegan, Henderson, Farabow, Garrett & Dunner, LLP

(57) ABSTRACT

Systems and methods are provided for building and implementing formulas. The systems and methods may treat operands in a formula as having a value and a unit type or dimension and may recognize the compatibility of unit types among operands. One embodiment performs automatic error checking of a formula based on the value and dimension of the operands and the expected result. The automatic error checking may be performed to assist a user in defining and building a formula. Another embodiment performs automatic unit conversion based on the value and unit type of the formula's operands. The automatic unit conversion may be performed when applying data to the formula during runtime or execution of an application program.

22 Claims, 13 Drawing Sheets

SYSTEMS AND METHODS FOR IMPLEMENTING FORMULAS

RELATED APPLICATION DATA

This is a divisional of application Ser. No. 10/898,921, filed Jul. 27, 2004, now U.S. Pat. No. 7,454,701, which claims the benefit of priority of U.S. Provisional Application No. 60/515,411, filed Oct. 30, 2003, entitled "Systems and Methods for Value Chain Analysis," and U.S. Provisional Application No. 60/539,974, filed Jan. 30, 2004, entitled "Systems and Methods for Value Chain Analysis," all of which are incorporated herein by reference.

BACKGROUND OF THE INVENTION

1. Field of the Invention

The present invention generally relates to the field of data processing and to computerized systems and methods that implement formulas. More particularly, the invention relates to systems and methods that assist users in building and implementing formulas for data processing and other applications.

2. Background Information

Many current computer software applications, such as spreadsheets and database managers, accept and use formulas. Generally, a formula is a mathematical construct that defines a relationship between two or more values contained in the formula's operands.

As a specific example of an application that uses formulas, consider a spreadsheet application. A typical spreadsheet is a computerized matrix of rows and columns defining cells. A spreadsheet resembles an accountant's worksheet and is used for tasks such as budgeting, check balancing, calculations for decision charts, grading calculations, and what-if computations, among others. Spreadsheet rows are typically labeled with numbers (1, 2, 3, 4, . . . ) and columns are typically labeled with letters (A, B, C, D, . . . ). A cell is identified by its column and row names, such as "C2."

A spreadsheet cell may contain different things, including a label, a value, a formula, or a function. A label is typically descriptive text. Labels cannot be treated mathematically; that is, they cannot be multiplied, subtracted, etc. A typical spreadsheet application program may treat any cell contents beginning with A-Z (e.g., ALIMONY, TOTAL, HOUSEHOLD EXPENSES, etc.) as a label. Values are numbers that are the data in a spreadsheet (e.g., 5, 123.45, 999.5, etc.). The spreadsheet can treat values mathematically. For example, with a spreadsheet, values can be multiplied, subtracted, squared, etc. Formulas defined in a spreadsheet may perform mathematical calculations on a set of operands, such as referenced cells and constants (e.g., A1+C2+A3, A1+A2/3, etc.). The calculation is determined by the operator(s) in the formula, which may be mathematical operators (+, −, *, /, etc.) or comparison operators (=, >, <, etc.), among others.

Many spreadsheets require formulas to begin with an equal sign "=," so the application recognizes the cell contents as a formula (e.g., =A1+C2+A3 and =A1+A2/3). The spreadsheet performs the mathematical operations on the referenced cells and constants.

The spreadsheet user (or calling program) defines a formula using a formula builder component of the application with an interface that allows the user to enter and edit a formula. In Microsoft Excel™ for example, the formula builder interface is a bar located below the toolbar. If the formula is not entered correctly, it may produce an erroneous result or be flagged as an error by the spreadsheet application. Similarly, if the referenced cells contain erroneous data, the formula's output will be incorrect.

A predefined set of formulas or functions may be built into the spreadsheet program. Common functions are available, such as: "SUM" which totals the values in the cells referenced; "AVERAGE" which finds the average of the values in the cells referenced; and "STDEV" which finds the standard deviation of the values in the cells referenced.

Typically, functions begin with an equals sign "=" followed by the function name and the referenced cells on which the function is performed. For example, =SUM(A1:A3) adds the values in the referenced cells A1+A2+A3 and places the answer in the cell containing the function. As with formulas, the spreadsheet user or calling program enters the function's referenced cells. If the referenced cells contain erroneous data, the function's output will be incorrect.

Errors in the result output by a formula or function can be costly, especially in applications used in business. For example, if formulas are used to compute the key operating figures for a company, errors in the formula output can generate misleading results or incorrect performance indicators. Many errors are caused by manual user input mistakes or variations in the data source(s), yet, business application customers must have a formula builder to define and implement formulas, which are often used to calculate key figures that are unique to each business. This is especially true for analytical applications, such as spreadsheets and database managers, because the formulas used tend to be highly user-specific and thus unsuited for canned predefinition in the application code by a software vendor.

Conventional formula builders, however, have several shortcomings that make the task of defining and implementing formulas complex and error prone. For instance, many of the values used in a typical business formula calculation have an associated dimension, such as a value that stands for an amount of money or a quantities of products, as opposed to being a dimensionless scalar. Conventional formula builders, however, (such as the one in the Microsoft Excel™ spreadsheet program) treat all values as scalars. This creates a problem if the formula performs an operation on nonscalar values having dimensions that don't match, such as adding an amount of money value to a quantity of widgets value. Similarly, treating all values as scalars creates a problem if the formula performs an operation on values that have the same dimension but different units, such as adding a quantity in pounds to a quantity in kilograms, or adding an amount in dollars to an amount in Euros.

Because of this treatment, the user of a conventional formula builder must check whether dimensions and/or units are consistent and correct, and if not, painstakingly create a formula that explicitly performs conversions and treats dimensions correctly.

Because they handle all values as scalars, conventional formula builders cannot detect errors caused by performing operations on operands having incompatible dimensions. For example, a conventional spreadsheet does not check whether a user-defined formula is erroneously trying to add a quantity-dimensioned operand (such as 100 pieces) to a price-dimensioned operand (such as 100 Euros per 100 pieces) or erroneously trying to multiply two quantities (such as 100 pieces× 50 pieces) instead of correctly multiplying a quantity by a scalar (100 pieces×50). Similarly, a conventional spreadsheet does not check whether a user-defined formula is erroneously trying to perform operations on two operands that are expressed in different units, such as adding a quantity expressed in units of pounds to a quantity expressed in units of kilograms. Not taking an operand's dimension and units into account causes errors and results in inefficient troubleshooting and correction of formulas.

For example, a business's production costs of materials are calculated by adding up the costs of all materials and activities required to produce its product. A basic formula for this to be entered in an application may be: Production Costs=Σ(Costs of Raw Materials)+Σ(Costs of Activities). A problem arises with this formula, however, if the values for the costs of raw materials and the values for the costs of activities are stored in the application in different currencies, as might be the case if materials are imported from one country to produce a product in another country. A conventional formula builder requires the user to explicitly enter currency unit conversions so that the formula calculates the correct results. Consider, for example, a conventional application program that includes a currency conversion function "CURRENCY_CONVERT" built into its formula builder that takes four parameters as input (amount, source currency unit, target currency unit, exchange rate), and outputs an amount of target currency. Using this function, the basic formula for production costs becomes, for example: Production Costs=Σ(IF(Currency of Raw Material x< >'USD', CURRENCY_CONVERT(Costs of Raw Material x, Currency of Raw material x, 'USD', Some Exchange Rate'), Costs of Raw Material x)+Σ(IF(Currency of Activity x< >'USD', CURRENCY_CONVERT(Costs of Activity x, Currency of Activity x, 'USD', Some Exchange Rate'), Costs of Activity x).

Entering this complicated, expanded, production costs formula into an application program is both cumbersome and error prone for a user. There are other problems as well. For example, a user who is unaware that the raw material and activity costs values are in different currencies will not include currency conversions when defining and entering the production costs formula, and the formula will produce an incorrect output, unknown to the user. As a further example, consider a business that switches from purchasing raw materials from a domestic supplier that charges in the local currency to purchasing raw materials from a foreign supplier that bills in a foreign currency. There is a large possibility that the business's personnel will forget to modify all the formulas in existing application programs so that they perform the newly needed currency unit conversions. And should they remember, it is costly to modify and test all the formulas in the business's existing application programs.

Accordingly, it is desirable to provide systems and methods in which a user does not need to explicitly define conversions for the currencies or other units involved when building a formula. It is desirable to automatically covert the values in a formula from one unit to another. It is also desirable to reduce the complexity of the formulas entered by a user and to provide greater flexibility. It is also desirable to automatically recognize errors associated with the dimensions of the operands used in formulas and to prevent the errors from entering the formula. It is also desirable to provide systems and methods in which the formulas do not need to be manually adjusted to compensate for currency unit changes, quantity unit changes, and/or other unit or dimension changes in the operands of the formulas.

SUMMARY OF THE INVENTION

Systems and methods consistent with the present invention assist users in implementing formulas. Embodiments of the invention include systems and methods for defining, building and executing formulas for data processing and other applications.

In accordance with one embodiment, systems and methods may be provided for identifying operand dimension errors to assist a user in defining a formula. Embodiments of the invention further include systems and methods for automatically adjusting or converting operand values according to their associated units during run-time or execution of a formula.

Embodiments of the invention may treat the operands in a formula and the result produced by a formula as having a value and a dimension and perform error checking of the formula and/or automatic unit conversion based on the value and dimension of the operands. Embodiments of the invention may also recognize the different units associated with operand dimensions and automatically convert unit types so that a formula is correctly processed.

Embodiments of the invention include systems, computer program products and methods performed by a processor for building a formula, the formula including an operator and operands with associated dimensions. The systems, computer program products and methods perform operations comprising: receiving a first operand of the formula, identifying a first dimension associated with the first operand, receiving an operator of the formula, determining a compatible dimension for the first dimension associated with the first operand, receiving a second operand, identifying a second dimension associated with the second operand, and flagging an error if the second dimension is not compatible with the first dimension.

Additional embodiments of the invention include systems, computer program products and methods performed by a processor for executing a formula having operands and an operator in an application program. The systems, computer program products and methods perform operations comprising: retrieving data corresponding to a first operand for the operator of the formula, identifying a first unit type associated with the first operand, retrieving data corresponding to a second operand for the operator of the formula, identifying a second unit type associated with the second operand, determining whether the second unit type is compatible with the first unit type, if the second unit type is not compatible with the first unit type, converting the data corresponding to the second operand into an equivalent value of a unit type compatible with the first unit type, and producing a result of the formula using the converted data.

In one embodiment, the second unit type is determined to be compatible with the first unit type if the unit types are the same. In another embodiment, the unit type of the expected result of the formula is analyzed to determine if the second unit type is compatible with the first unit type.

In accordance with another embodiment of the invention, a method is provided for executing a formula having operands and an operator. The method performs operations comprising: retrieving data corresponding to at least one operand for the operator of the formula, identifying a unit type associated with the at least one operand, determining whether the unit type of the at least one operand is consistent with an expected unit type to that operand, and if the unit type is not consistent with the expected unit type, converting the data corresponding to the operand into a value with a unit type that is compatible with the expected unit type.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION

Figure 1:
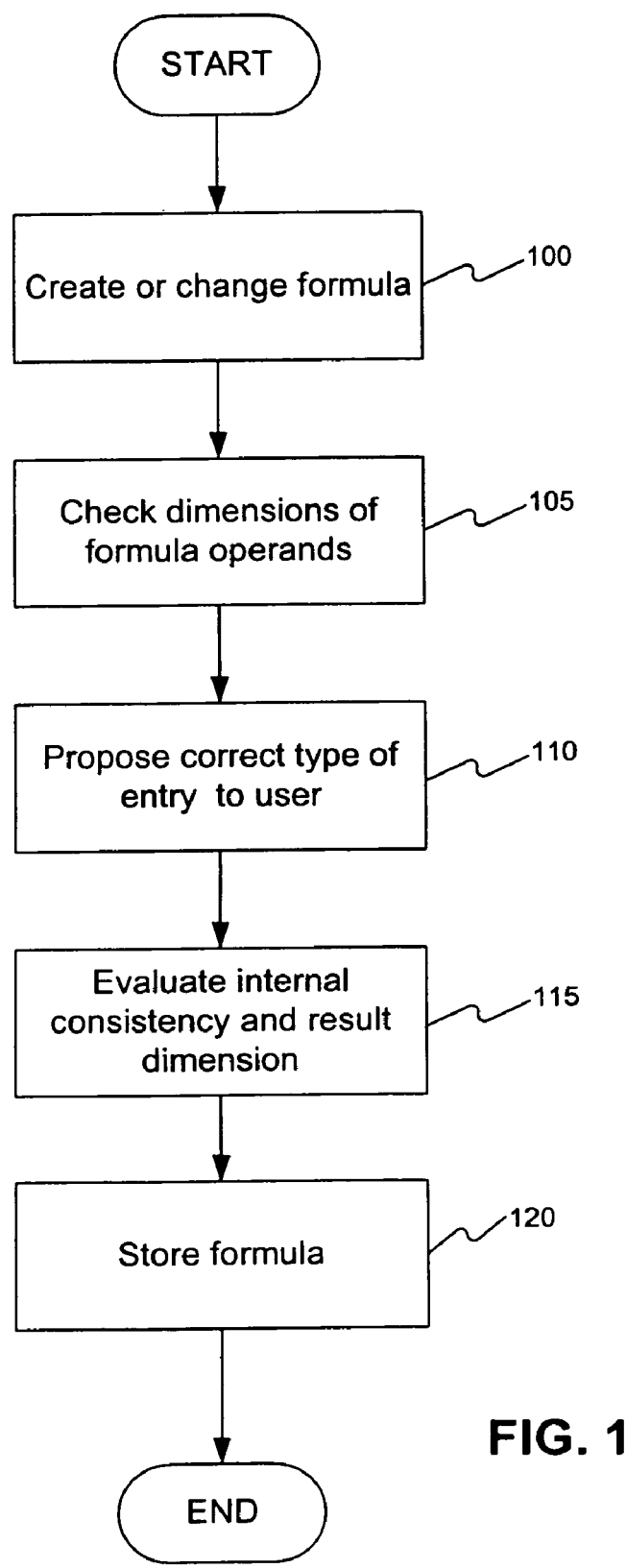
FIG. 1 is a flow chart of an exemplary method for building formulas, consistent with an embodiment of the invention.

Reference will now be made in detail to exemplary embodiments of the invention, examples of which are illustrated in the accompanying drawings. Wherever convenient, the same reference numbers are used in the drawings to refer to the same or like parts.

FIG. 1 is a flow chart representing an exemplary method for building formulas. The exemplary method of FIG. 1 may be implemented as a computer-executable process using a data processing system or another suitable computing environment. By way of example, in accordance with one embodiment of the invention, the process is included in a formula builder component or tool of an application program, such as a spreadsheet program or database manager program.

The data processing system executing the process of FIG. 1 first allows a user or a calling program to create or change a formula (step 100). In one embodiment, a formula toolbar interface may be displayed or otherwise provided to allow a user to enter a formula or edit an existing formula using, for example, a keyboard and standard editing commands. The interface may support natural language commands and/or require that the user define the formula using a library of command codes for functions and/or operands. Further, drop-down windows and the like may be provided to assist the user in selecting the appropriate commands and building or editing the formula. As will be appreciated by those skilled in the art, these and other conventional features may be used to implement the interface and perform this step.

Next, the process checks the dimension of each of the operands in the formula (step 105). Each operand may be treated as having a value and a dimension. A dimension describes the operand value, analogous to a type in computer programming languages. Examples of dimensions include a quantity dimension, which represents a quantity of something other than money, (e.g., 100 pieces has a value of "100" and a dimension of "quantity of pieces"), an amount dimension, which represents an amount of money (e.g., $5.00 has a value of "5.00" and a dimension of "amount of dollars"), a price dimension which represents an amount dimension associated with a quantity dimension (e.g., $5.00 per 100 pieces is a more complex dimension having an amount of "$5.00" associated with a quantity of "100 pieces"), and a "quantity with a base quantity" dimension, which represents a quantity of something (other than money) associated with a base quantity of something (e.g., 100 kilograms out of 1000 kilograms). A scalar is also a type of dimension.

Based on the analysis, the process proposes to the user suitable dimensions or possible data items with suitable dimensions, such as a cell reference, variable, function, or constant of a suitable dimension type, that can compatibly be used in the operand that the user is currently editing (step 110).

In one embodiment, while a user defines or edits a formula, the formula builder process analyzes the formula's structure and the dimensions of the variables, functions, and constants used for each operand, and prompts the user interactively during editing. For example, as the user defines a formula that calculates a cost value by multiplying a consumption quantity operand and a price operand (i.e., costs=consumption quantity*price), when the user enters "=quantity*," the formula builder process proposes data items of dimension type "price" or functions that are able to return a "price" dimensioned value to fill in the missing operand. In one embodiment consistent with the invention, the dimension types are built into the formula builder. In another embodiment the dimension types may be defined by a user.

In yet another embodiment, the process analyzes the entire formula after the user has finished editing, and points out all of the needed dimension-related corrections at once. The process may prompt the user and propose correct formula entries using drop-down and/or pop-up windows, redlines in the formula builder toolbar, voice-synthesized audio instructions, and/or other forms of display or prompting.

In one embodiment consistent with the invention, the process determines the suitably compatible dimension(s) for an operand based in part on a set of rules for the operator(s) used in a formula. For example, in the case of an addition mathematical operator "+," the rule for compatibility may be that the two operands on either side of the plus sign must both have the same dimension type, such as both being scalars. Thus, for the interactive prompting embodiment, if the user begins to enter a formula such as "=A1+," the process will determine the dimension of the referenced cell or variable A1 for the operand on the left hand side of the plus sign, and remind the user that an operand with the same dimension should be entered next, on the right hand side of the plus sign. For instance, if the referenced cell or variable A1 contains the data item "100 pieces," the process will prompt the user to enter for the operand after the plus sign a data item that has a quantity type dimension. In one embodiment, the process may also consider the unit of the desired dimension and prompt the user to enter a data item with the same unit type as well as the same dimension type.

Another example of a compatibility rule may be that the multiplication operator "*," should have at least one scalar-dimensioned operand on either side of the multiplication sign, and may have an operand with any dimension on the other side. Thus, if referenced cell or variable A1 contains the non-scalar data item "100 pieces," the process will propose that the user enter a scalar at the point where the user has typed "=A1*" and provide an error indication if the user next enters a non-scalar-dimensioned data item instead.

One of ordinary skill will recognize that such rules may be tailored according to the expected values or correct output of a formula and/or one or more rules may be provided for each operator. For example, if the expected multiplication formula output dimension is a quantity with a unit of "foot-pounds," the multiplication operator rule may be tailored to prompt the user to enter an operand with a quantity dimension having unit type "feet" and an operand with a quantity dimension having unit type "pounds." In such embodiments, the rules take into account the output result's dimension definitions and unit types, including the more complex dimensions, such as price, which is an amount per base quantity (e.g., $5.00 per 100 pieces). Thus, for example, the division operator rules may allow a user to enter a formula that divides an amount operand by a currency quantity operand to produce a price-dimensioned result.

In another embodiment consistent with the invention, a rule for suitable dimensions of operands for arithmetic function operators such as +, −, =, < >, <, >, <=, >= and all kind of statistical functions such as average, minimum, maximum and standard deviation may be that all operand must have the same dimension type. If the expected dimension type of the result value has been specified, all operands must be of that same type.

One embodiment uses one or more of the notations listed in Table 1 to aid in the rule determination and error checking of a formula's operands for the dimension types: scalar, amount, quantity, price, and/or quantity with base quantity.

TABLE 1

|  | Dimension Amount | Dimension Quantity | Short Notation |
|---|---|---|---|
| Scalar | 0 | 0 | (0, 0) |
| Amount (of money) | 1 | 0 | (1, 0) |
| Quantity | 0 | 1 | (0, 1) |
| Price | 1 | −1 | (1, −1) |
| Quantity with base quantity | 0 | 0 | (0, 0) |

In one embodiment, these combinations of dimension types may handle almost all business application error checking using rules simplified to algebraic formulas that are applied to the dimension notations. For example, to calculate the correct dimension of the value returned by a multiplication, the dimensions of both operands are summed. Thus for quantity*price: (0,1)+(1,−1)=(0+1, 1−1)=(1,0), and the correct result is an amount. For quantity*"quantity with base quantity:" (0,1)+(0,0)=(0,1) and the correct result is a quantity. For amount*amount: (1,0)+(1,0)=(1+1, 0+0)=(2,0), and the result is a notation value that is not in Table 1. Accordingly, this indicates that multiplying an amount by an amount is incorrect as the operands are incompatible for the multiplication operator.

For division, the dimension of the denominator may be subtracted from the numerator's dimension. For example, amount/quantity: (1,0)−(0, 1)=(1−0, 0−1)=(1, −1), and the correct result is a price. Further, for amount/scalar: (1,0)−(0, 0)=(1,0), and the correct result is an amount.

These notations and rules may also be used to determine the result of a complex term, for example, quantity 1*amount 1/(quantity 2*(amount 2/amount 3) may be analyzed as (0,1)+(1,0)−(0,1)−((1,0)−(1,0))=(1,0), indicating that the correct result is an amount.

In this embodiment, there is at least one exception to be considered: the multiplication of two quantities may correctly return another quantity, e.g., meter times meter yields square meters. In the notation described in Table 1 and the associated rules, the result would be (0, 2). Hence to allow this operation on certain quantities, Table 1 could be modified to include a (0, 2) notation for a quantity, thus allowing the rules to consider correct a formula that calculates a quantity by multiplying two other quantities. It follows, however, that the formula can only yield a correct result if the unit of the result (like square meters) exists and if it is known to any unit conversion service deployed.

Rules for other mathematical operators, comparison operators, such as equal, and other operators may also be implemented, consistent with the principles of the invention. Rules for the inputs and outputs of common predefined functions, such as SUM and AVERAGE, may also be implemented as part of the exemplary process of FIG. 1. One of ordinary skill will recognize that other techniques for analyzing formulas, including those containing parenthesis and those based on operator precedence, may also be implemented without undue experimentation.

In one embodiment consistent with the invention, the process recognizes that some dimensions are compatible with more than one other dimension for some operators. One or ordinary skill will recognize that such compatibility capabilities may be implemented with additional rules.

In one embodiment consistent with the invention, the process determines the suitable dimension for an operand based in part on the expected output of the formula instead of, or in addition to, predefined rules for each operator. The expected output may be based on the dimension that holds the formula result, on user input, or on some other source. For example, to check a formula that calculates a cost amount (e.g., $100) by multiplying a consumption quantity and a price (i.e., cost=consumption quantity*price), the process dynamically evaluates the operands' dimensions as they are entered and determines what dimension(s) is needed to complete the equation. Thus, when the user enters "=A1*" the formula builder process analyzes the dimension of "A1," determines that it has a quantity dimension type and a unit type of "pieces" (for example), and given that the formula output is a cost amount (in units of dollars for example), proposes data items or functions of dimension type "price" for the second operand, because only a price-dimensioned operand (e.g., dollars/pieces) can be multiplied by the quantity-dimensioned first operand to produce an amount-dimensioned result. For example, 100 pieces (consumption quantity)*$5 per 100 pieces (price)=$5 (cost amount).

Referring again to FIG. 1, the process may also evaluate the entire formula for internal consistency in terms of, for example, operand dimensions, intermediate results dimensions, and dimension of the result (step 115). This step may be performed after the user or calling application has entered a complete formula. In one embodiment consistent with the invention, the process may include a check on whether the result of an entered formula has the dimension expected by the application, and if not, the process may notify the user of the problem and/or proposes corrections for the error. Depending upon the application environment, step 115 may be made optional or eliminated entirely from the exemplary process of FIG. 1.

After the formula has been checked and corrected, the formula may be stored (step 120). As part of this step, the formula may be stored in a database or other storage application on a disk or other storage medium. The formula may be stored separately (e.g., so that the formula may be called and used by one or more application programs) or as part of an executable applications program for data processing and/or other uses, such as a spreadsheet application program.

FIGS. 2a-2i illustrate an exemplary user interface for building a formula consistent with the invention. In these figures, assume a user is building the following formula:

IF Sales Quantity< >0 THEN

Calculated Price=Total Costs/Sales Quantity;

ELSE

Calculated Price=Total Costs/Schedules Activity, wherein the result "Calculated Price" has a dimension of type price (i.e., amount/quantity), "Sales Quantity" has a dimension of type quantity, "Total Costs" has a dimension of type amount, and "Schedules Activity" is a function that returns an amount-dimensioned type value.

Figure 2A:
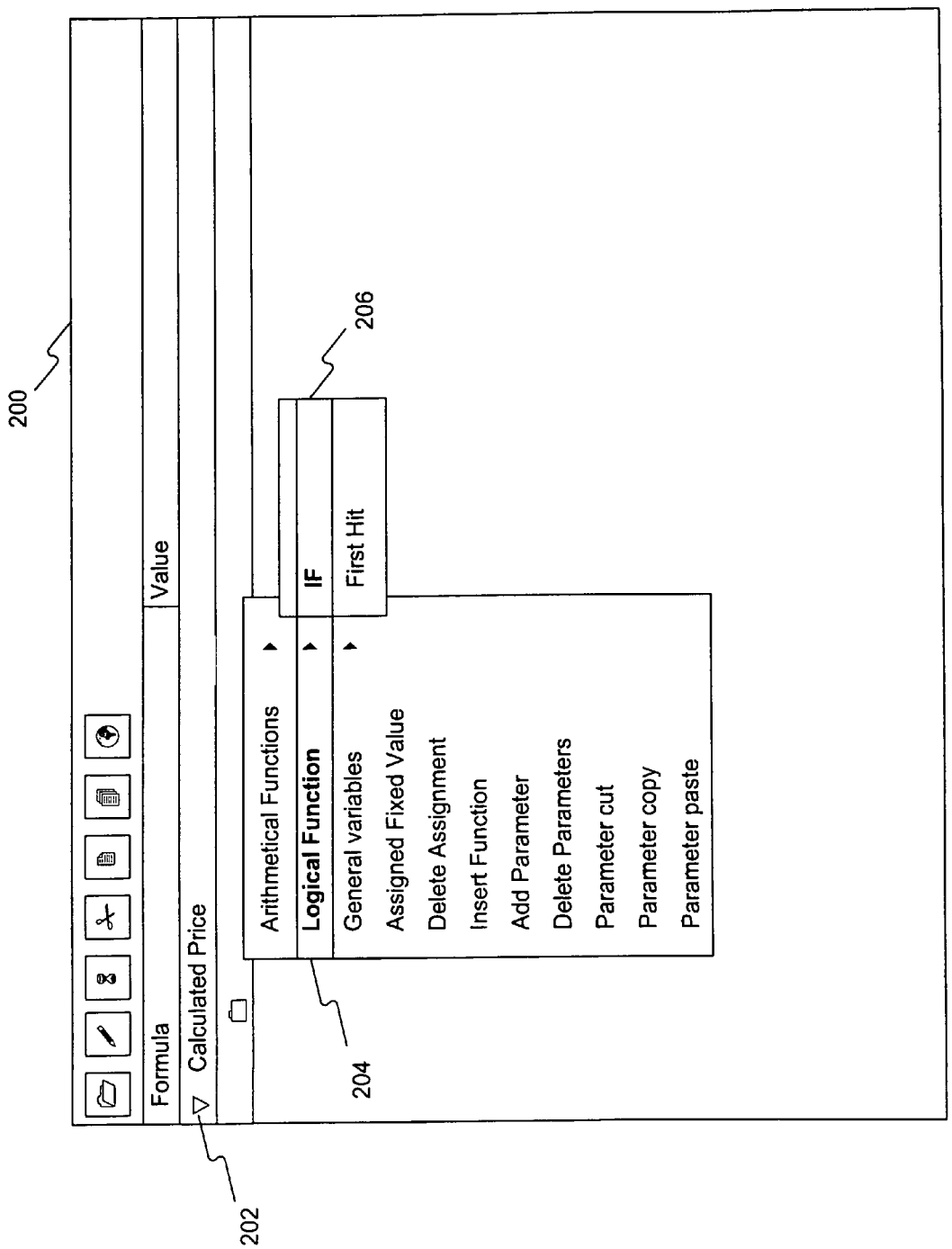
FIGS. 2a-2i illustrate exemplary user interfaces for building a formula, consistent with embodiments of the invention.

The exemplary formula builder interface 200 illustrated in FIG. 2a first enables a user to specify the result or output of the formula, including the dimension type of the result, such as a calculated price 202. After specifying the result, the user proceeds to define the formula that produces the result. For the formula discussed above as an example, the user chooses "logical function" from the menu of formula parts 204, and chooses the "IF" function 206 from the submenu of logical functions.

Figure 2B:
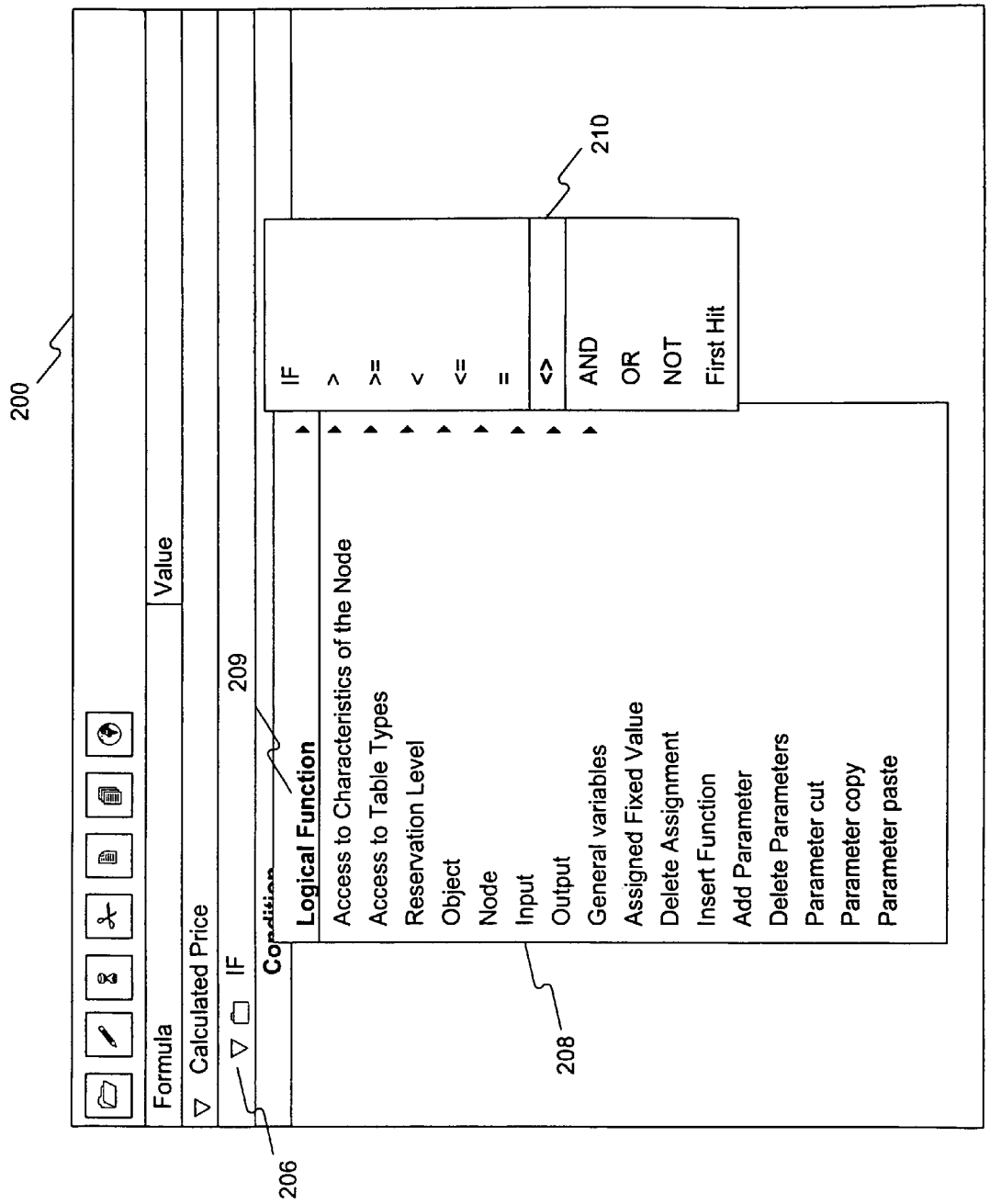

As further shown in FIG. 2b, formula builder interface 200 may respond by displaying a menu of possible conditions 208 for the "IF" function 206. To implement the sample formula noted above, the user selects "logical function" 209 from the menu of possible conditions 208 and selects not-equal-to ("<>") from the submenu of logical functions 210.

Figure 2C:
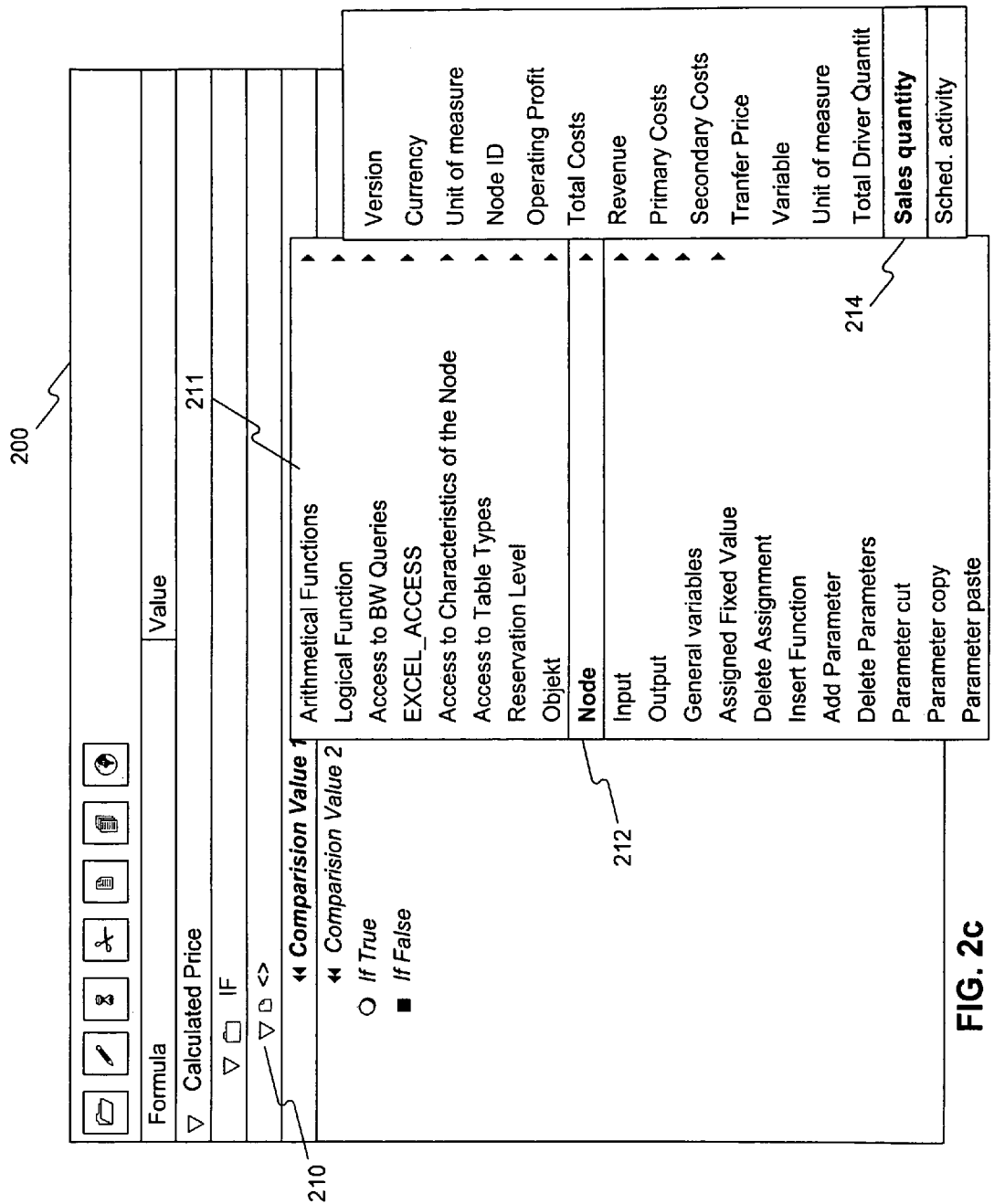

As shown in FIG. 2c, based on the selection of the not-equal-to function 210, formula builder interface 200 may display a menu of possible operands 211 for the first value to be compared by the not-equal-to function 210. To implement the exemplary formula noted above, the user chooses "node" 212 from the menu 211 and chooses "sales quantity" from the submenu of possible nodes 214, as illustrated in FIG. 2c.

Figure 2D:
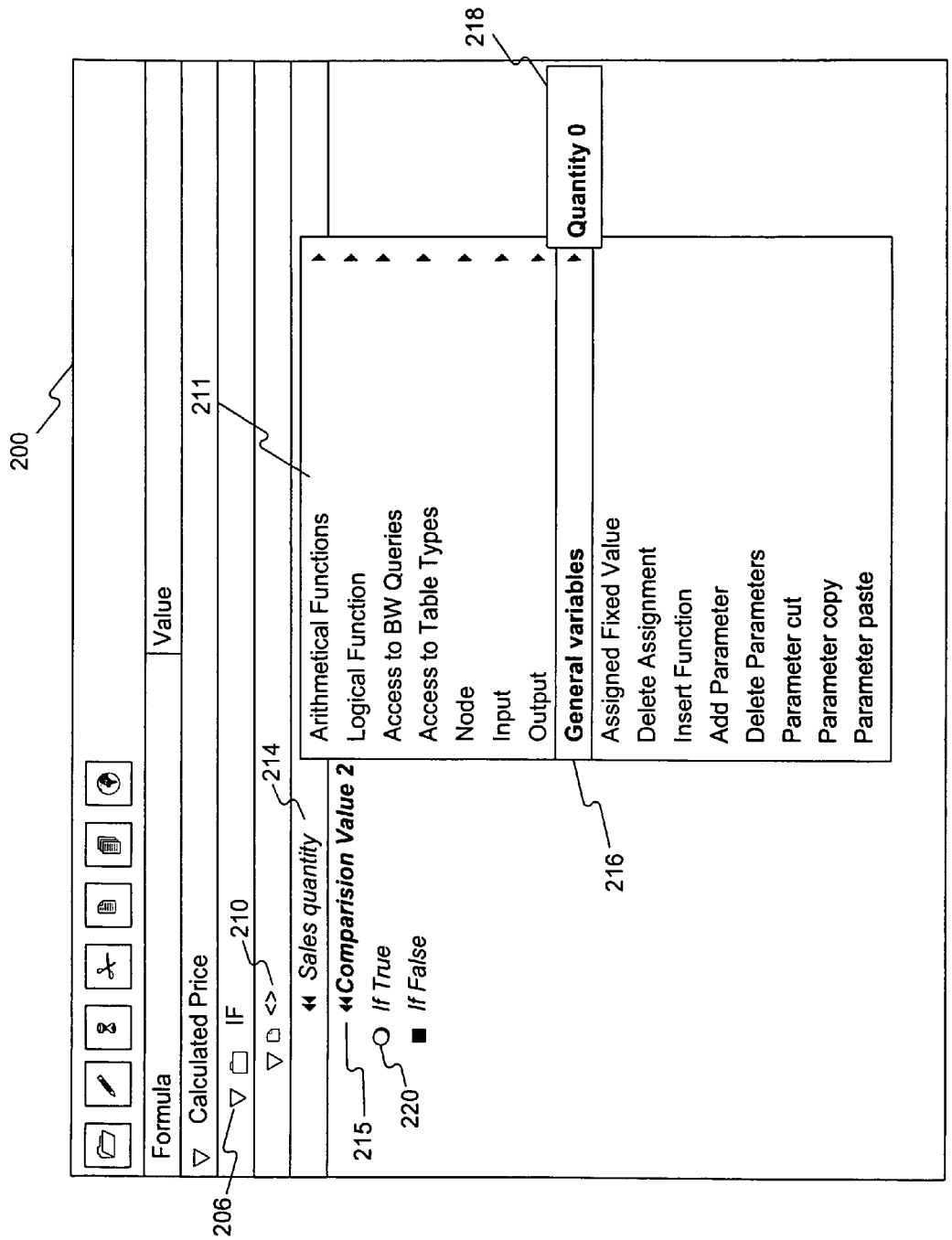

Referring to FIG. 2d, a user may then use exemplary interface 200 to define the second operand "comparison value 2" 215 for the not-equal-to operator 210 by selecting "general variables" 216 from a menu of possible operands 211 and selecting "quantity 0" 218 from the resulting submenu. At this point, the user has defined the first portion of the formula as: "IF Sales Quantity<> Quantity 0."

Next, the user may choose an operator for the "if true" branch 220 of the IF operator 206. To implement the exemplary formula, the user chooses the function "/" (division) (not shown).

Figure 2E:
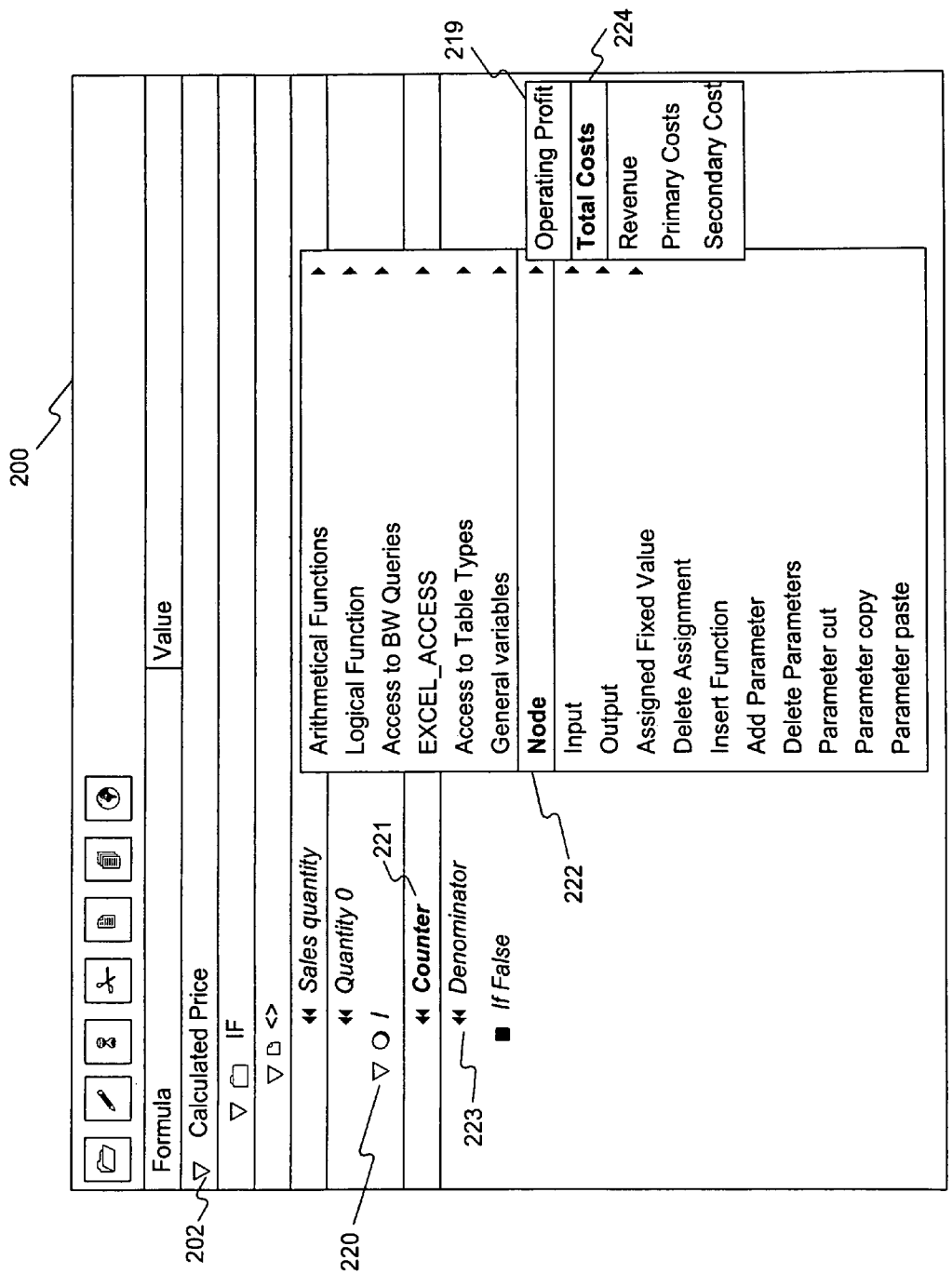

As illustrated in FIG. 2e, interface 200 may then present the two operands for the "/" function operator, labeled "counter" 221 and "denominator" 223. In response to the user selecting "counter" 221, the interface may display a menu of possible data items for the operand. In the example of FIG. 2e, the user chooses "node" 222. To implement the formula described above, the user then chooses "total costs" 224 from the resulting submenu 219 as the data item for the "counter" operand 221 for the division "/" operator 220. As shown, the interface 200 proposes only data items having a dimension type of "amount" as choices for the "counter" operand on submenu 219 because to produce the price-dimensioned result "calculated price" 202, the numerator of the division operator 220 should have a dimension of type amount.

Figure 2F:
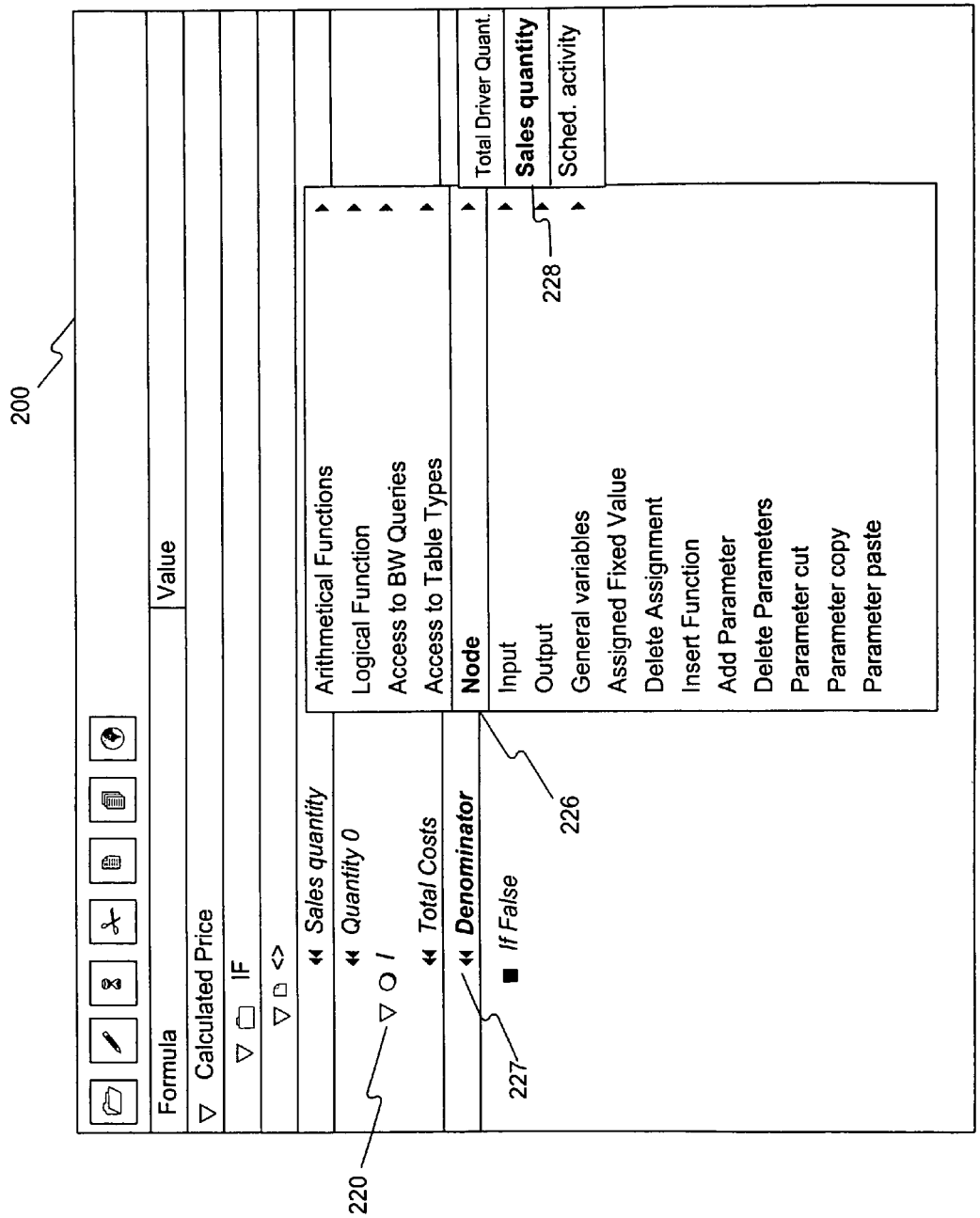

Referring to FIG. 2f, exemplary interface 200 may similarly display, and the user may similarly select "sales quantity" 228 for the "denominator" operand 227 of the division operator 220. And again as shown, interface 200 may propose data items having a dimension type of "quantity" (such as "sales quantity" 228) as choices for the "denominator" operand on a submenu because to produce the price-dimensioned result "calculated price" 202, the denominator of the division operator 220 should have a dimension of type quantity.

Figure 2G:
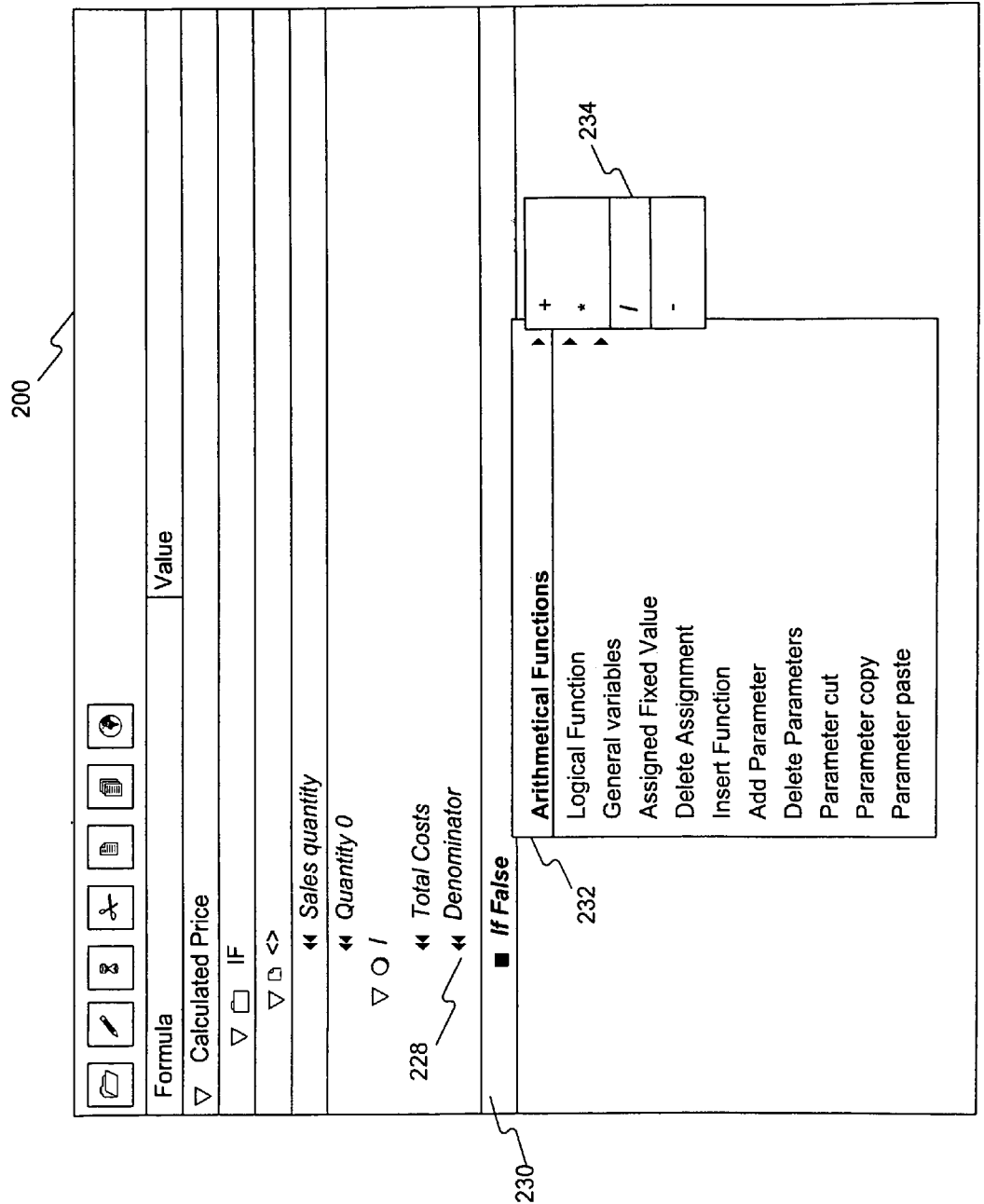

As shown in FIG. 2g, using exemplary interface 200, the user may next choose an operator for the "if false" branch 230 of the IF operator 206. For instance, to implement the exemplary formula, the user chooses the function "/" (division) 234 from a submenu after selecting "arithmetic functions" 232 from a menu of available operator types.

Figure 2H:
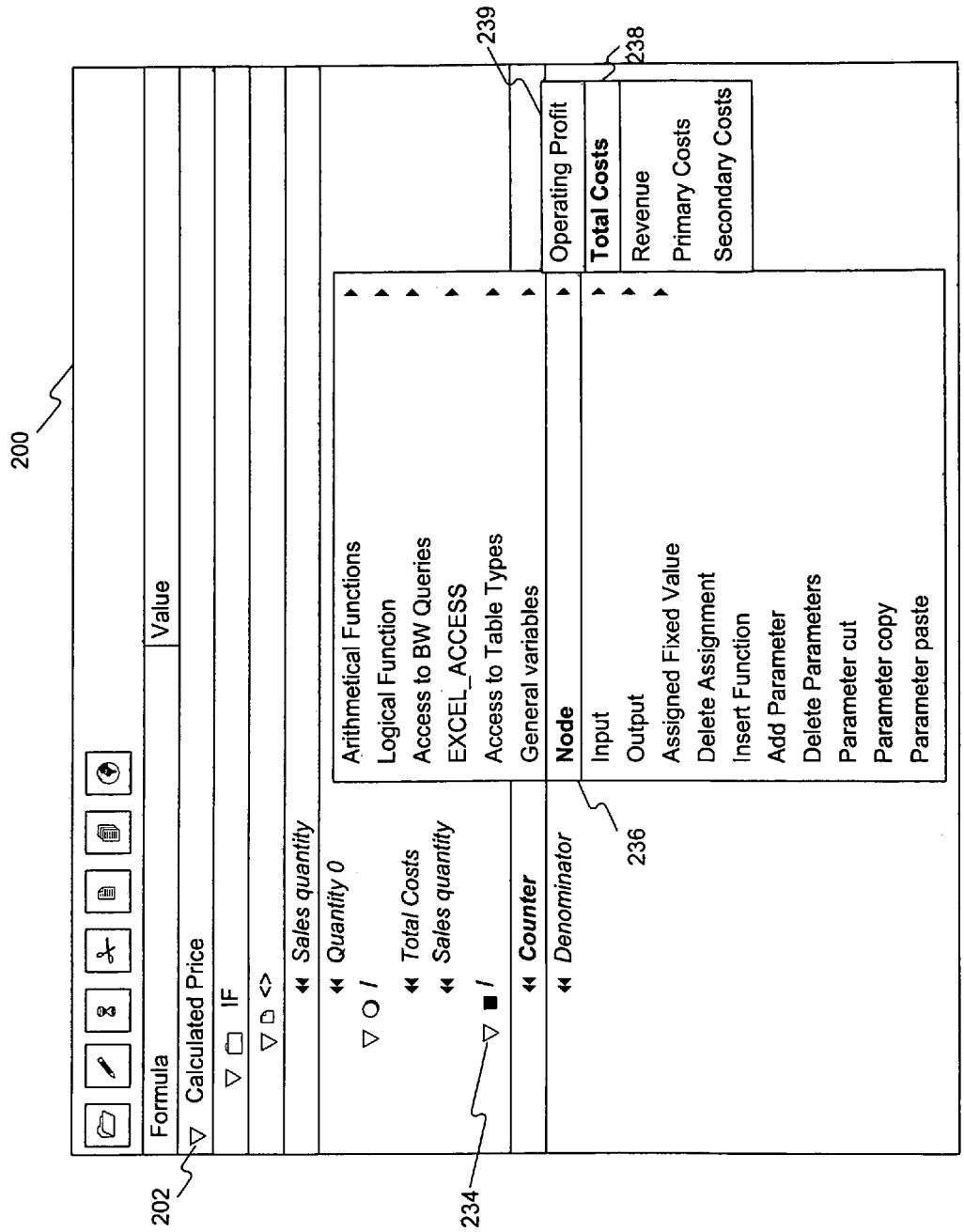

As shown in FIG. 2h, when the user defines the "counter" operand of the "/" function operator 234, interface 200 may display a menu of possible data items for the operand, allowing the user to choose "node" 236. To implement the exemplary formula, the user chooses "total costs" 238 from the resulting submenu 239 as the "counter" operand for the division "/" operator 234. As shown, interface 200 may propose only data items having a dimension type of "amount" as choices for the "counter" operand on submenu 239 because to produce the price-dimensioned result "calculated price" 202, the numerator of the division operator 234 should have a dimension of type amount.

Figure 2I:
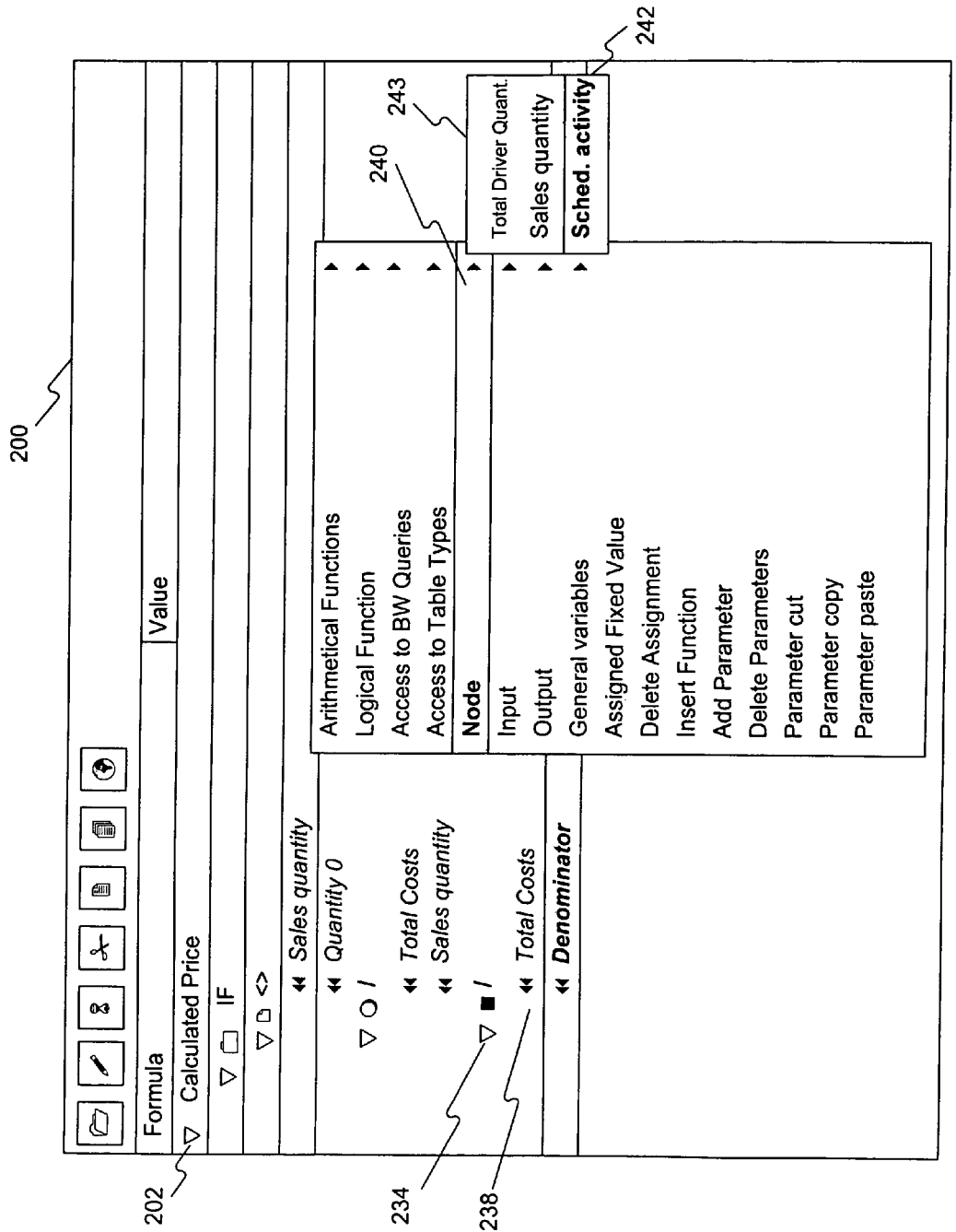

Referring to FIG. 2i, exemplary interface 200 may similarly display, and the user may similarly select "sched. activity" 242 for the denominator operand of the division operator 234. And again as shown, interface 200 may propose data items having a dimension type of "quantity" as choices for the "denominator" operand on submenu 243 because to produce the price-dimensioned result "calculated price" 202, the denominator of the division operator 234 should have a dimension of type quantity. For this branch of the "IF" operator, "sales quantity" is zero, so the user and formula builder avoids dividing by zero and uses the "schedule activity" function operand 242 to return a non-zero, quantity-dimensioned value and/or perform divide-by-zero error handling.

As described with respect to FIGS. 1 and 2, a user may create or edit a formula with operands containing different yet compatible dimensions. In one embodiment consistent with the invention, during run-time or execution of a formula, the formula builder process may check whether any dimension unit conversions, such as currency unit conversions for operands having an amount dimension, are necessary based on the data input and perform them automatically. Additionally, or alternatively, the application may specify the currency or other unit type of the result to be returned by the formula.

In one embodiment consistent with the invention, unit type checks and any necessary unit conversions are performed at formula run time or evaluation time because the exact unit type of an operand's dimension is often unknown until the formula is evaluated using the data items referenced by the operands, which are variable. For example, a formula template for spreadsheets to calculate project costs does not contain cell values when it is created. The units or currencies of the referenced cell operands is unknown at formula creation time, but it is known, for example, that a certain column will contain quantities with some type of unit or that the function "GetPrice( )" will always return a price, which includes a currency unit and a quantity unit. Checks and conversions of the operands' units and other units can be performed when the template has been used to create a new spreadsheet containing cell values and the formula is evaluated using these values.

Figure 3:
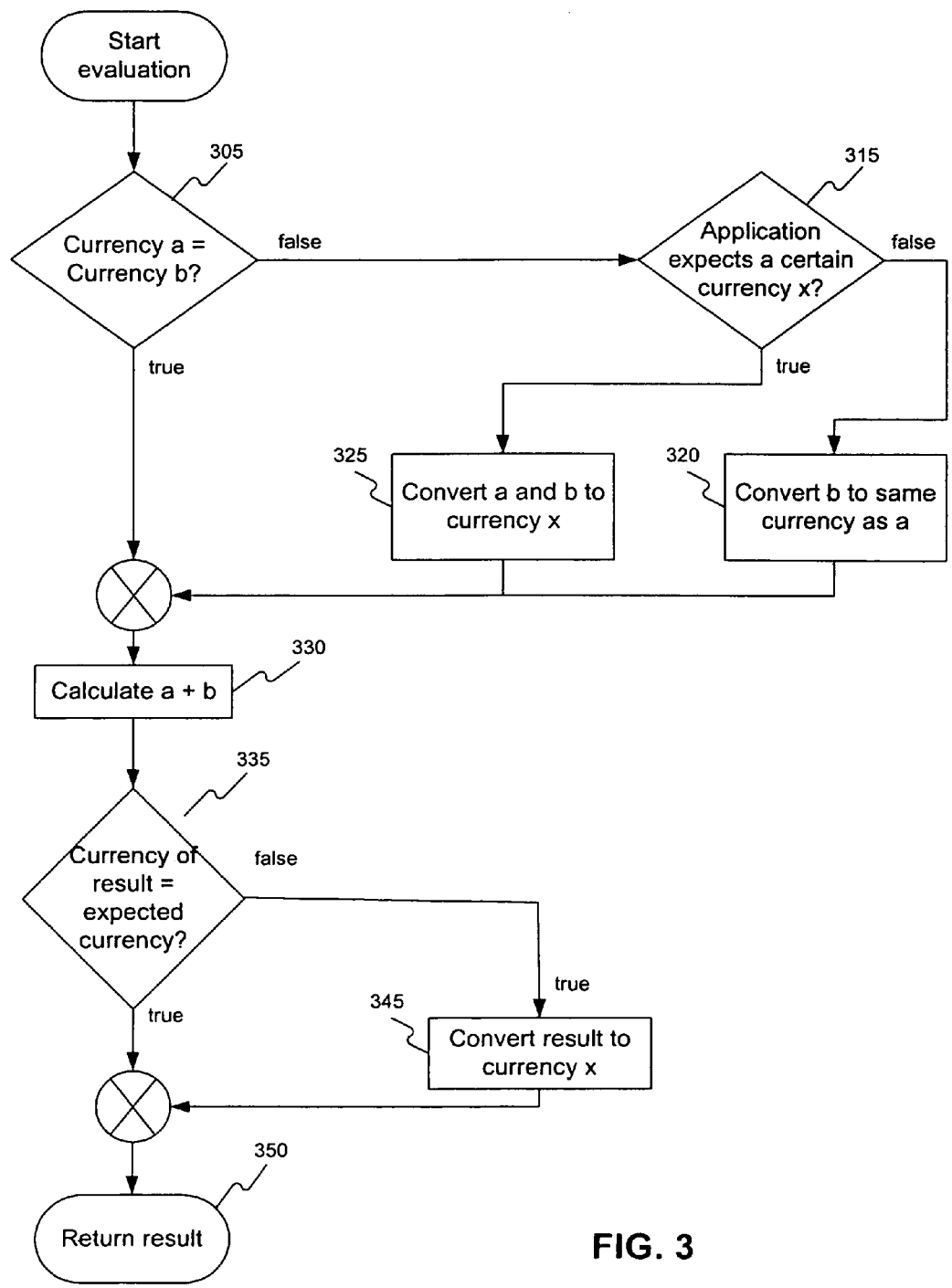
FIG. 3 is a flow chart of an exemplary method for implementing a formula with unit conversion, consistent with another embodiment of the invention.

For purposes of illustration, FIG. 3 is a flow chart of an exemplary process for implementing a formula with unit conversion. As with other embodiments of the invention, the exemplary method of FIG. 3 may be implemented as a computer-executable process using a data processing system or another suitable computing environment. In the example of FIG. 3, the type of unit conversion illustrated is for currency conversion. The currency conversion of FIG. 3 is applicable to formulas of the form "=a+b," where a and b are amounts of currency. As will be appreciated by those skilled in the art, the exemplary process of FIG. 3 may be adapted for other formulas, as well as other types of unit conversion (e.g., weight, volume, etc.).

In evaluating the formula "=a+b," the process first determines whether the data input for operands a and b have the same currency unit type (step 305). If not (step 305, False), the process determines whether the application program expects the output of the formula to be of a certain currency type, shown as currency type "x" (step 315). If not (step 315, False), the process converts the value for amount b into an equivalent value amount of the currency type of operand a (step 320). If, on the other hand, the application program does expect the output of the formula to be currency type "x" (step 315, True), then the process converts both data inputs for the operands a and b to amounts of currency type "x" (step 325).

If the original currency types of a and b are the same (step 305, True), or after conversion to the same type (step 320 or step 325), the process calculates the sum of a plus b to produce a result (step 330).

If the currency type of the result is the expected output currency type for the formula (step 335, True), then the process returns the calculated result (step 350).

If, on the other hand, the currency type of the result is not the output currency type expected by the application using the formula (step 335, False), then the process converts the result to an amount of expected currency type "x" (step 345), and returns the converted result (step 350).

One of ordinary skill will recognize that a similar process can be used to convert unit types other than the currency types illustrated, consistent with the invention. For example, the invention may be implemented to convert profits, costs, percentages, weights, distances, volumes and/or any other units of measure, value, etc.

Figure 4:
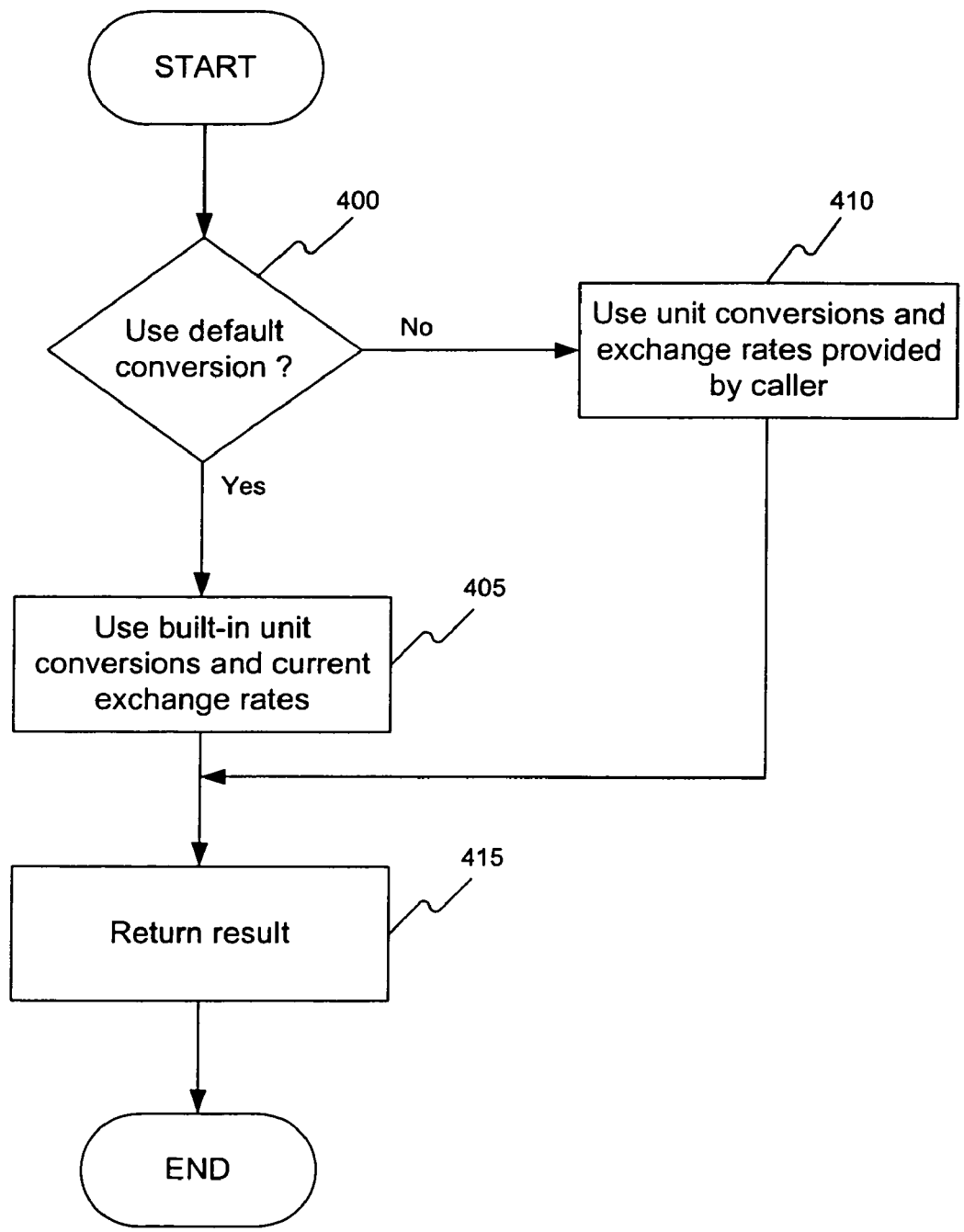
FIG. 4 is a flow chart further representing an exemplary method for performing currency unit conversion, consistent with an embodiment of the invention.

In another embodiment consistent with the invention, each time a formula is evaluated the application program or user can choose either to use default unit conversions or to provide their own conversion service. By way of example, FIG. 4 is a flow chart of an exemplary process for implementing such an embodiment. The exemplary method of FIG. 4 may be implemented as a computer-executable process using a data processing system or another suitable computing environment. In the example of FIG. 4, the type of unit conversion described is again currency conversion. As noted above, embodiments of the invention are not limited to currency conversion and, accordingly, the embodiment of FIG. 4 may be adapted for handling other types of unit conversion, either alone or in combination.

As shown in FIG. 4, the process determines whether a default conversion is to be used (step 400). If so (step 400, Yes), the process uses built-in or pre-stored unit conversion(s) (step 405). In the case of currency unit conversions, currency exchange rates may be stored to perform needed currency conversions. To ensure that the most current or accurate rates are used, exchanges rates may be updated and stored periodically (e.g., daily, once a week, once a month, etc.). The stored currency exchange rates may represent current or average rates, and/or the rates may represent the exchange rates accepted or applied by a business or other entity for accounting purposes.

In step 405, the built-in unit conversion(s) may be applied to perform any needed currency conversions on the data input. Currency conversions may be performed to convert, for example, an amount of dollars to an amount of Euros, as might be done for example in steps 420, 425, and/or 445 of FIG. 4. Further, consistent with the present invention, any combination of unit conversions may be performed depending on the data input for the operands and the formula being evaluated. Thus, other unit conversions may be built-in or stored, such as unit conversions to convert an amount of pounds to an amount of kilograms, and applied alone or in combination with the currency conversions.

In one embodiment consistent with the invention, the built-in conversion capability includes data for converting all common physical units. Additionally, the conversion sub-process may convert currencies using the current date and exchange rates obtained from a network server, such as an SAP NetWeaver server, or other up-to-date data source. In another embodiment consistent with the invention, the data, settings, and rates for currency and/or other unit conversions are separate and independent from the formula entry and evaluation components of the formula builder, such that the conversion components may be centrally changed any time to affect the evaluations of one or many applications' formulas without changing any of the formulas themselves.

As further shown in FIG. 4, if default conversion is not used (step 400, No), the process uses unit conversion(s) provided by the calling application or user (step 410). For currency conversions, a pop-up window or other interface may be provided to permit a user to enter the needed exchange rates and/or other unit conversion(s). In one embodiment, the calling application provides an application-specific conversion service for uncommon unit conversions, such as piece to kilogram.

Using the converted operands, the process may evaluate the formula and return the result (step 415). Consequently, the user does not need to worry about conversions when defining formulas for an application. Thus, referring to an earlier example, a user could simply enter the basic production costs formula: Production Costs=Σ(Costs of Raw Materials)+Σ(Costs of Activities), without explicitly defining the conversions needed for a correct result. Instead, such conversions may be performed automatically during, for example, run-time and dependent on the data inputs for the formula.

Figure 5:
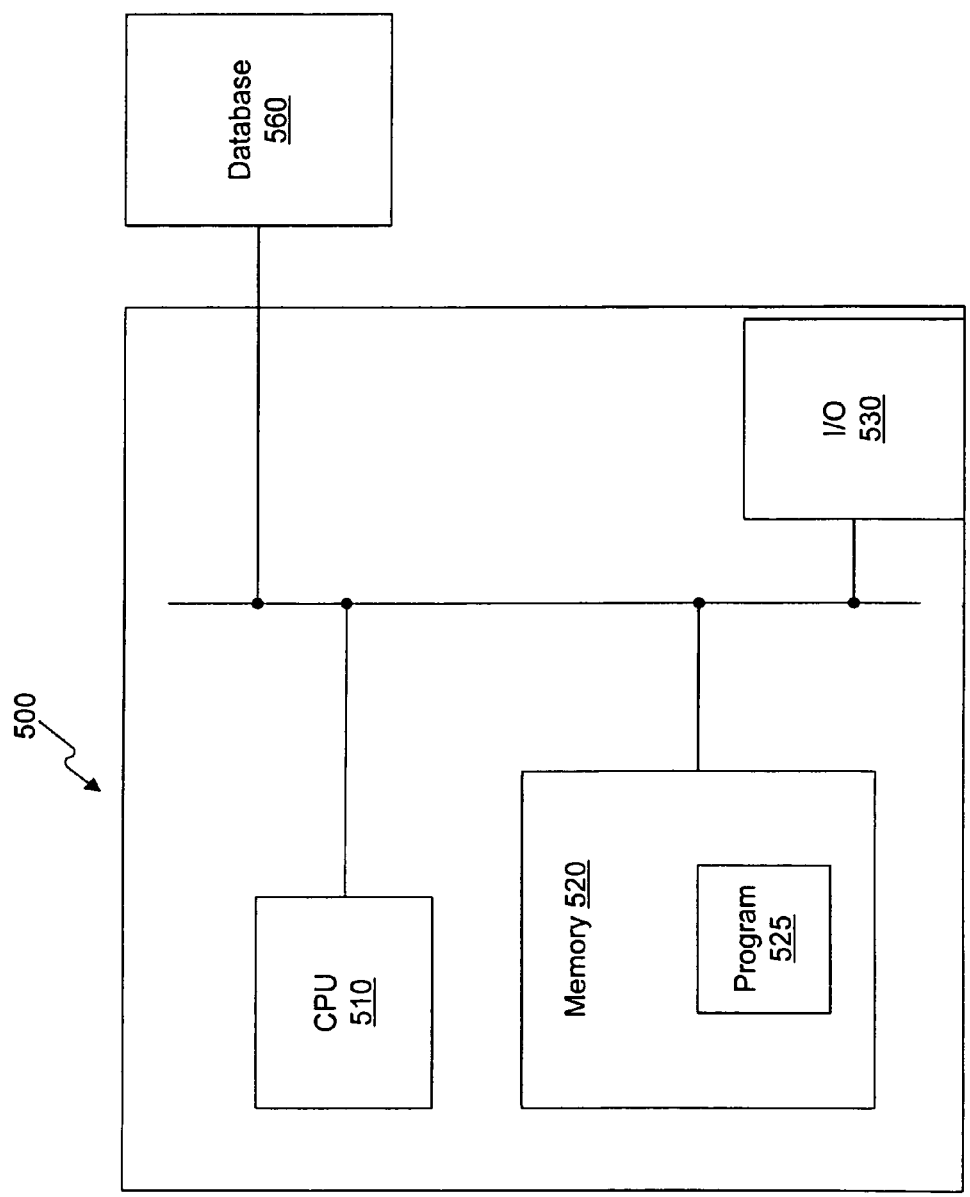
FIG. 5 is a block diagram of an exemplary data processing system suitable for use with embodiments of the invention.

As disclosed herein, embodiments of the invention may be computerized and implemented in data processing systems or other computing environments. By way of example, FIG. 5 illustrates an exemplary computing system 500 that can be used to implement embodiments of the invention. The components and arrangement, however, are not critical to the present invention.

System 500 includes a number of components, such as a central processing unit (CPU) 510, a memory 520, an input/output (I/O) device(s) 530, and a database 560 that can be implemented in various ways. For example, an integrated platform (such as a workstation, personal computer, laptop, etc.) may comprise CPU 510, memory 520 and I/O devices 530. In such a configuration, components 510, 520, and 530 may connect through a local bus interface and access to database 560 (implemented as a separate database system) may be facilitated through a direct communication link, a local area network (LAN), a wide area network (WAN), an intranet, the Internet and/or other suitable connections.

CPU 510 may be one or more known processing devices, such as a microprocessor from the Pentium™ family manufactured by Intel™. Memory 520 may be one or more storage devices configured to store information used by CPU 510 to perform certain functions related to embodiments of the present invention. Memory 520 may be a magnetic, semiconductor, tape, optical, or other type of storage device. In one embodiment, memory 520 includes one or more programs 525 that, when executed by CPU 510, perform various processes consistent with the present invention. For example, memory 520 may include a formula builder program 525 that, when executed by CPU 510, treats operands referenced in a formula as having a value and a dimension or unit, and performs error checking of the formula and automatic unit conversion based on the value and dimension or unit type of the operands. Memory 520 may also include other programs that perform other functions consistent with embodiments of the invention.

Methods, systems, and articles of manufacture consistent with the present invention are not limited to programs configured to perform dedicated tasks. For example, memory 520 may be configured with a program 525 that performs several functions when executed by CPU 510. That is, memory 520 may include an application program that includes a formula builder component, a component for searching database 560, and a component for implementing formulas with unit conversions, such as currency conversions and/or other types of unit conversions, when evaluating or executing a formula. Alternatively, CPU 510 may execute one or more programs located remotely from system 500. For example, system 500 may access one or more remote programs that, when executed, perform functions related to embodiments of the present invention.

Memory 520 may be also be configured with an operating system (not shown) that performs several functions well known in the art when executed by CPU 510. By way of example, the operating system may be Microsoft Windows™, Unix™, Linux™, an Apple Computers operating system, Personal Digital Assistant operating system such as Microsoft CE™, or other operating system. The choice of operating system, and even the use of an operating system, is not critical to the invention.

I/O device(s) 530 may comprise one or more input/output devices that allow data to be received and/or transmitted by system 500. For example, I/O device 530 may include one or more input devices, such as a keyboard, touch screen, mouse, and the like, that enable data to be input from a user. Further, I/O device 530 may include one or more output devices, such as a display screen, printer, speaker devices, and the like, that enable data to be output or presented to a user. The configuration and number of input and/or output devices incorporated in I/O device 530 are not critical to the invention.

Database 560 may comprise one or more databases that store information and are accessed and managed through system 500. By way of example, database 560 may be an Oracle™ database, a Sybase™ database, or other relational database. Systems and methods of the present invention, however, are not limited to separate databases or even to the use of a database. Information, such as unit and currency conversion information, for example, may come from a database or practically any source, such as the internet and other organized collections of data or memory systems.

The system depicted in FIG. 5 is exemplary, and one of ordinary skill in the art will recognize that the embodiments described and suggested above can be implemented using most known conventional equipment and programming techniques.

One of ordinary skill will also recognize that although the embodiments are often described in the context of a spreadsheet application, the principles of the invention are broadly applicable to almost any application program that uses formulas to calculate amounts, quantities, prices, and other things having units or dimensions associated with them.

Other embodiments of the invention will be apparent to those skilled in the art from consideration of the specification and practice of the invention disclosed herein. It is intended that the specification and examples be exemplary only, with a true scope and spirit of the invention being indicated by the following claims.

What is claimed is:

1. A method performed by a processor for executing a formula having operands and an operator in an application program, comprising:
   retrieving data corresponding to a first operand for the operator of the formula;
   identifying a first dimension associated with the first operand;
   retrieving data corresponding to a second operand for the operator of the formula;
   identifying a second unit type associated with the second operand;
   determining whether the second unit type is compatible with the first unit type;
   if the second unit type is not compatible with the first unit type, converting the data corresponding to the second operand into a compatible value in terms of the first unit type; and
   producing a result of the formula using the converted data.

2. A method according to claim 1, wherein the second unit type is determined to be compatible with the first unit type if the first unit type and the second unit type are equivalent.

3. A method according to claim 1, further comprising:
   analyzing a unit type of an expected result of the formula to determine whether the second unit type is compatible with the first unit type.

4. A method according to claim 1, wherein determining whether the second unit type is compatible with the first unit type further comprises:
   analyzing compatibility based upon a predetermined rule for the operator.

5. A method according to claim 1, wherein converting the data corresponding to the second operand into a compatible value in terms of the first unit type further comprises:
   obtaining a fixed conversion factor; and
   using the fixed conversion factor to convert the data corresponding to the second operand.

6. A method according to claim 5, wherein the fixed conversion factor comes from a predetermined unit conversion table.

7. A method according to claim 1, wherein converting the data corresponding to the second operand into a compatible value in terms of the first unit type further comprises:
   obtaining a variable conversion factor from an updatable data source; and
   using the variable conversion factor to convert the data corresponding to the second operand.

8. A system for executing a formula having operands and an operator in an application program, comprising:
   means for retrieving data corresponding to a first operand for the operator of the formula;
   means for identifying a first unit type associated with the first operand;
   means for retrieving data corresponding to a second operand for the operator of the formula;
   means for identifying a second unit type associated with the second operand;
   means for determining whether the second unit type is compatible with the first unit type;
   means for converting the data corresponding to the second operand into a compatible value in terms of the first unit type, if the second unit type is not compatible with the first unit type; and
   means for producing a result of the formula using the converted data.

9. A system according to claim 8, wherein the second unit type is determined to be compatible with the first unit type if the first unit type and the second unit type are equivalent.

10. A system according to claim 8, further comprising:
    means for analyzing a unit type of an expected result of the formula to determine whether the second unit type is compatible with the first unit type.

11. A system according to claim 8, wherein the means for determining whether the second unit type is compatible with the first unit type further comprises:
    means for analyzing compatibility based upon a predetermined rule for the operator.

12. A system according to claim 8, wherein the means for converting the data corresponding to the second operand into a compatible value in terms of the first unit type further comprises:
    means for obtaining a fixed conversion factor; and
    means for using the fixed conversion factor to convert the data corresponding to the second operand.

13. A system according to claim 12, wherein the fixed conversion factor comes from a predetermined unit conversion table.

14. A system according to claim 8, wherein the means for converting the data corresponding to the second operand into a compatible value in terms of the first unit type further comprises:
    means for obtaining a variable conversion factor from an updatable data source; and
    means for using the variable conversion factor to convert the data corresponding to the second operand.

15. A memory with a residing computer program product for executing a formula having operands and an operator in an application program, comprising code residing in the memory for causing a processor to perform the steps of:
    retrieving data corresponding to a first operand for the operator of the formula;
    identifying a first unit type associated with the first operand;
    retrieving data corresponding to a second operand for the operator of the formula;
    identifying a second unit type associated with the second operand;
    determining whether the second unit type is compatible with the first unit type;
    if the second unit type is not compatible with the first unit type, converting the data corresponding to the second operand into a compatible value in terms of the first unit type; and
    producing a result of the formula using the converted data.

16. The memory with computer program product according to claim 15, wherein the second unit type is determined to be compatible with the first unit type if the first unit type and the second unit type are equivalent.

17. The memory with computer program product according to claim 15, further comprising the step:
    analyzing a unit type of an expected result of the formula to determine whether the second unit type is compatible with the first unit type.

18. The memory with computer program product according to claim 15, wherein determining whether the second unit type is compatible with the first unit type further comprises:
    analyzing compatibility based upon a predetermined rule for the operator.

19. The memory with computer program product according to claim 15, wherein converting the data corresponding to the second operand into a compatible value in terms of the first unit type further comprises:
    obtaining a fixed conversion factor; and
    using the fixed conversion factor to convert the data corresponding to the second operand.

20. The memory with computer program product according to claim 19, wherein the fixed conversion factor comes from a predetermined unit conversion table.

21. The memory with computer program product according to claim 15, wherein converting the data corresponding to the second operand into a compatible value in terms of the first unit type further comprises:
    obtaining a variable conversion factor from an updatable data source; and
    using the variable conversion factor to convert the data corresponding to the second operand.

22. A method for executing a formula including operands and an operator, the method comprising:
    retrieving data corresponding to at least one operand for the operator of the formula;
    identifying a unit type associated with the at least one operand;
    determining whether the unit type of the at least one operand is consistent with an expected unit type to that operand; and
    if the unit type is not consistent with the expected unit type, converting the data corresponding to the operand into a value having a unit type that is compatible with the expected unit type.

* * * * *